US009871334B2

(12) United States Patent
Dempsey et al.

(10) Patent No.: US 9,871,334 B2
(45) Date of Patent: Jan. 16, 2018

(54) SLIP RING HAVING A LIQUID METAL CONTACT BETWEEN A STATIONARY ELEMENT AND A ROTATABLE ELEMENT

(71) Applicant: Sikorsky Aircraft Corporation, Stratford, CT (US)

(72) Inventors: Patrick J. Dempsey, New Haven, CT (US); William A. Welsh, North Haven, CT (US); Aaron Kellner, Bloomfield, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 15/434,739

(22) Filed: Feb. 16, 2017

(65) Prior Publication Data

US 2017/0244209 A1    Aug. 24, 2017

Related U.S. Application Data

(60) Provisional application No. 62/298,901, filed on Feb. 23, 2016.

(51) Int. Cl.
| | | |
|---|---|---|
| *H01R 39/00* | (2006.01) | |
| *H01R 41/00* | (2006.01) | |
| *H01R 39/64* | (2006.01) | |
| *B64C 27/04* | (2006.01) | |
| *B64C 27/32* | (2006.01) | |

(52) U.S. Cl.
CPC ........... *H01R 39/646* (2013.01); *B64C 27/04* (2013.01); *B64C 27/32* (2013.01)

(58) Field of Classification Search
CPC .......... H01R 3/08; H01R 13/23; H01R 39/00; H01R 39/30; H01R 39/64; H01R 39/646

USPC ....... 439/5, 13, 21, 23, 190; 310/219, 102 R
See application file for complete search history.

(56) References Cited

U.S. PATENT DOCUMENTS

| | | | | | |
|---|---|---|---|---|---|
| 3,163,792 | A | * | 12/1964 | Sayers ................... | H02K 31/04 310/102 R |
| 3,271,603 | A | * | 9/1966 | Wiedemann ........ | H01M 2/0215 310/11 |
| 3,835,436 | A | * | 9/1974 | Klaudy ................ | H01R 39/646 310/219 |
| 3,972,577 | A | * | 8/1976 | Charles ................ | H01R 39/646 439/21 |
| 4,483,574 | A | * | 11/1984 | Chabrerie ............. | H01R 39/24 310/219 |

(Continued)

FOREIGN PATENT DOCUMENTS

| | | |
|---|---|---|
| DE | 102005045959 A1 | 4/2007 |
| DE | 102009018655 A1 | 10/2010 |
| DE | 102009038685 A1 | 3/2011 |

*Primary Examiner* — Chandrika Prasad
(74) *Attorney, Agent, or Firm* — Locke Lord LLP; Scott D. Wofsy; Christopher J. Cillié

(57) ABSTRACT

A slip ring assembly includes a stationary element, a rotatable element rotatable relative to the stationary element, and a liquid metal contact electrically coupling the rotatable element to the stationary element. The liquid metal contact includes a metallic material having a melting temperature that is less than zero degrees Celsius and a boiling temperature that is greater than four-hundred degrees Celsius to electrically couple an electrical device fixed relative to the rotatable element to an electrical device fixed relative to the stationary element through the liquid metal contact.

15 Claims, 7 Drawing Sheets

(56) References Cited

U.S. PATENT DOCUMENTS

| | | | | |
|---|---|---|---|---|
| 5,391,846 A | * | 2/1995 | Taylor | H01H 29/06 |
| | | | | 200/233 |
| 5,478,978 A | * | 12/1995 | Taylor | H01H 29/06 |
| | | | | 200/233 |
| 5,508,003 A | * | 4/1996 | Rancourt | C22C 28/00 |
| | | | | 420/555 |
| 5,792,236 A | | 8/1998 | Taylor et al. | |
| 5,972,236 A | * | 10/1999 | Tanaka | H01L 21/30617 |
| | | | | 134/1.3 |
| 7,560,847 B2 | | 7/2009 | Hsu | |

* cited by examiner

SLIP RING HAVING A LIQUID METAL CONTACT BETWEEN A STATIONARY ELEMENT AND A ROTATABLE ELEMENT

CROSS-REFERENCE TO RELATED APPLICATION

This application claims the benefit of priority under 35 U.S.C. §119(e) to U.S. Provisional Application No. 62/298, 901, filed Feb. 23, 2016, which is incorporated herein by reference in its entirety.

BACKGROUND OF THE INVENTION

1. Field of the Invention

The present disclosure relates to rotor systems, and more particularly to slip ring assemblies for rotor systems in rotorcraft.

2. Description of Related Art

Rotorcraft commonly employ rotor systems to generate lift and provide control for the aircraft during flight. Some rotor systems employ rotor assemblies with electrical devices fixed to rotary portions of the rotor assembly, such as to the rotor assembly hub and/or rotor blades. Examples of such electrical devices include sensors, heater mats for ice protection systems, and actuators for active vibration control systems. Such devices generally communicate with electrical components in the rotorcraft airframe, typically using electrical signals or electrical power conveyed between across an interface between a stationary component and a rotating component. Slip ring assemblies, for example, communicate electrical signals or power across such interfaces using a graphite brush and metal plate arrangement. As one rotates relative to the other, electrical current crosses the interface by flowing between the graphite brush and metal plate. Because the graphite brush typically touch the rotating metal plate, slip ring assemblies employing brushes typically employ a springs or similar devices to force the brush against the plate and can require periodic cleaning to remove particulate from the interface.

Such conventional methods and systems have generally been considered satisfactory for their intended purpose. However, there is still a need in the art for improved systems and methods for communicating electrical signals and/or power between stationary and rotating components. The present disclosure provides a solution for this need.

SUMMARY OF THE INVENTION

A slip ring assembly includes a stationary annular element, a rotatable element rotatable relative to the stationary annular element, and a contact electrically coupling the rotatable element to the stationary annular element. The contact includes a metallic material having a melting temperature that is less than zero degrees Celsius and a boiling temperature that is greater than four-hundred degrees Celsius to conduct electrical current between the stationary annular element and the rotatable element.

In certain embodiments, metallic material can have a melting temperature that is about negative nineteen (−19) degrees Celsius. The metallic material can have a boiling temperature that is greater than about thirteen hundred (1300) degrees Celsius. The metallic material can include an alloy having each of gallium, indium, and tin. The metallic material can include gallium in an amount that is about 68% by total weight, indium in an amount that is about 22% by total weight, and tin in an amount that is about 10% by total weight. The metallic material can have an electrical conductance that is greater than about $3.0 \times 10^6$ siemens per meter at twenty (20) degrees Celsius.

In accordance with certain embodiments, the stationary element can be connected to a static mast. The static mast can circumferentially surround a rotation axis. A bus bar can be disposed within the static mast. A stationary annular contact can be connected to the bus bar. The stationary annular contact can extend through a penetration in the static mast and can extend radially outward relative to the rotation axis. The stationary annular contact can extend axially downward. An insulating body can envelope a portion of the stationary annular contact outside of the static mast. A portion of the stationary annular contact can be received within a gravity well, and the gravity well can house the metallic material. A high-torque conductive slip clutch can be disposed within the stationary element. The high-torque conductive slip clutch can electrically connect a radially inner portion of the stationary annular contact with a radially outer portion of the stationary annular contact. The high-torque conductive slip clutch can be configured to allow the radially outer portion of the stationary annular contact to rotate relative to the radially inner portion of the stationary annular contact.

A dry seal can bound the gravity well on a radially inner end, radially restricting the metallic material to a portion of the gravity well radially outward of the dry seal. In this respect, a first portion of the gravity well volume can be occupied by the metallic material and second portion of the gravity well volume can be occupied by an inert gas, such as nitrogen, helium or argon. A stationary portion of the dry seal can include an axially extending annulus race with a polished stainless steel surface facing radially outward from the rotation axis. It is contemplated that the gravity well can bounded on a radially inner end by one or more ferrofluidic seals. A first ferrofluidic seal can be disposed axially above the gravity well. The first ferrofluidic seal can be disposed between a first bearing assembly and the gravity well. The second ferrofluidic seal can be disposed between a second bearing assembly and the gravity well. The ferrofluidic seals can hermetically seal the gravity well from the external environment. An inert gas can be disposed within the hermetically sealed gravity well. One or more heating elements may thermally communicative with the metallic material disposed within the gravity well.

It is also contemplated that, in accordance with certain embodiments, a rotor shaft can be supported for rotation within the static mast. The shaft can extend axially beyond the static mast, and the rotatable element can be suspended from the shaft by a flexible mounting. The rotatable element can include a first flange member bounding the gravity well. The rotatable element can include a second flange member axially stacked below the first flange member. A rotatable contact can be disposed axially between the first flange member and the second flange member. The rotatable contact can have contoured surface bounding the gravity well. A stationary annular contact can extend through the gravity well, oppose the contoured surface of the rotatable contact, and the metallic material can be disposed therebetween.

It is further contemplated that the first flange member and the second flange member can extend axially upwards and radially inward relative to the rotation axis. The stationary annular contact can also extend axially upwards and radially inward relative to the rotation axis. The first and second flange members can be angled relative to the rotation axis, such as at about a 37-degree angle. One or more seal flanges seated within the first and second flange members can radially inward from the flange members, bound the gravity well, and be sealably received against the annular seal race. Either or both of the seal flanges can include PTFE, or graphite-filled PTFE.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
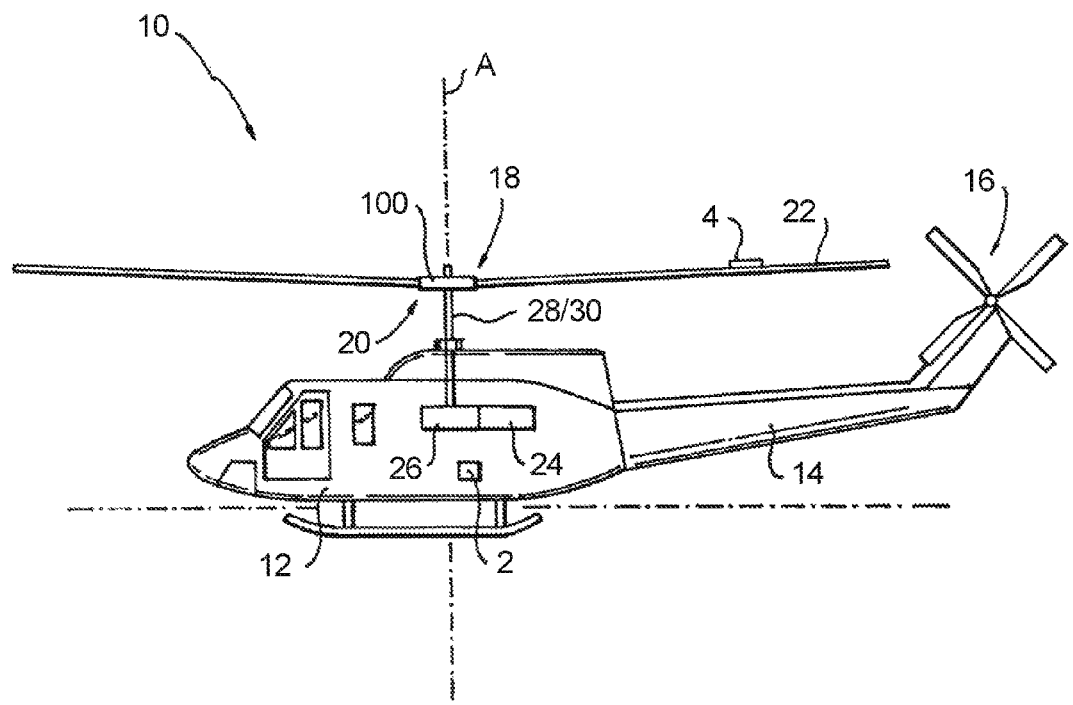
FIG. 1 is a schematic side elevation view of an exemplary embodiment of a rotorcraft constructed in accordance with the present disclosure, showing a slip ring assembly.

Reference will now be made to the drawings wherein like reference numerals identify similar structural features or aspects of the subject disclosure. For purposes of explanation and illustration, and not limitation, a partial view of an exemplary embodiment of a slip ring assembly in accordance with the disclosure is shown in FIG. 1 and is designated generally by reference character 100. Other embodiments of slip rings in accordance with the disclosure, or aspects thereof, are provided in FIGS. 2-7, as will be described. The systems and methods described herein can be used for communicating electrical current between stationary and rotatable elements in rotorcraft like helicopters, however the invention is not limited to a particular type of rotorcraft or to aircraft in general.

Referring to FIG. 1, a rotorcraft 10 including slip ring assembly 100 is shown. Rotorcraft 10 includes an airframe 12, a longitudinally extending tail 14 with a tail rotor assembly 16, and a main rotor assembly 18. Main rotor assembly 18 is supported for rotation about a rotation axis A by airframe 12, and includes a hub 20 and a plurality of rotor blades 22. Hub 20 is disposed axially along rotation axis A, and each of the plurality of rotor blades 22 extend radially outwards from hub 20 for rotation in concert with hub 20 about rotation axis A.

Airframe 12 includes one or more engines 24 and a gearbox 26. Engine 24 is operably connected to main rotor assembly 18 through gearbox 26 and a shaft 28 extending along rotation axis A between airframe 12 and main rotor assembly 18. A static mast 30 extends along rotation axis A and extends circumferentially about shaft 28. Slip ring assembly 100 is connected between main rotor assembly 18 and static mast 30 to electrically couples an electrical device, e.g., a power source 2, carried by airframe 12 with an electrical device, e.g., a heater mat 4, carried by rotor blade 22. Non-limiting examples of such electrical devices include temperature and/or vibration transducers, heater mats for ice protection systems, and actuators for an active vibration systems. Although a particular exemplary rotorcraft arrangement, i.e. a helicopter, is illustrated in FIG. 1, it is to be understood and appreciated that the systems and methods described herein can be included in other types rotorcraft, such as rotorcraft having compound, coaxial rotor systems. It is to be appreciated and understood that, while described herein as communicating electrical current to a main rotor system-mounted electrical device, slip ring assembly 100 can also be used to communicate electrical current to a tail rotor system-mounted electrical device.

Figure 2:
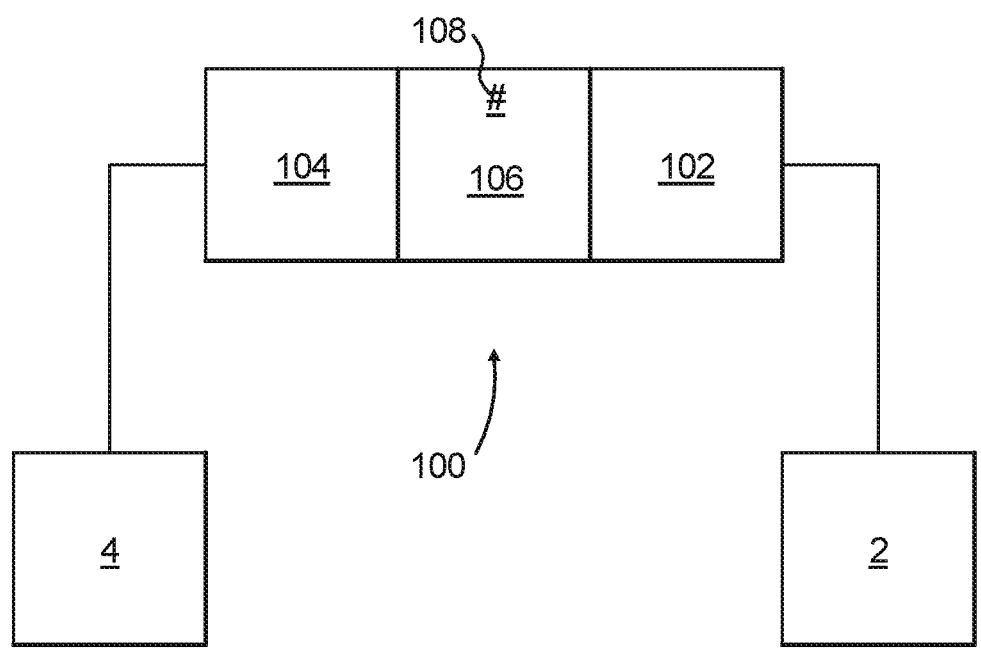
FIG. 2 is a schematic view of the slip ring assembly of FIG. 1, showing a stationary element coupled to a rotatable element by a liquid metal contact.

With reference to FIG. 2, slip ring assembly 100 is shown. Slip ring assembly 100 includes a stationary element 102, a rotatable element 104 rotatable relative to the stationary element, and a liquid metal contact 106 electrically coupling rotatable element 102 to stationary element 102. Liquid metal contact 106 includes a metallic material 108 having a melting temperature that is less than zero (0) degrees Celsius and a boiling temperature that is greater than four-hundred (400) degrees Celsius. In the illustrated exemplary embodiment, slip ring assembly 100 electrically connects an electrical device 32 carried by airframe 12 (shown in FIG. 1) with an electrical device 34 carried by a rotor blade 22 (shown in FIG. 1) of rotorcraft 10 (shown in FIG. 1). It is contemplated that the illustrated circuit can be a power circuit, electrical device 32 being a power source supplying electrical power to electric device. It is also contemplated that the illustrated circuit can be a communication circuit, such as a digital communication circuit between a processor and a transducer by way on non-limiting example.

Figure 3:
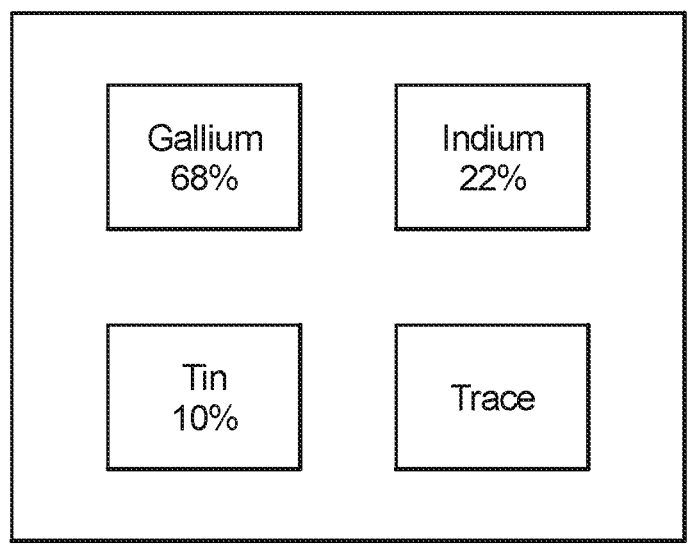
FIG. 3 is a schematic view of the liquid metal contact of the slip ring assembly of FIG. 1, showing the constituent elements of the metallic material forming the liquid metal contact.

With reference to FIG. 3, metallic material 108 is shown. Metallic material 108 is a liquid at room temperature, includes a eutectic alloy of gallium, indium, and tin, and may include one or more trace elements. In the illustrated exemplary embodiment, metallic material 108 includes gallium in an amount of 68% by total weight, indium in an amount of 22% by total weight, and tin in an amount of 10% by total weight. Metallic material 108 has a melting temperature that is about −19 degrees Celsius, a boiling temperature that is about 1300 degrees Celsius, and an electrical conductance that is greater than about $3.0 \times 10^6$ siemens/meter at twenty (20) degrees Celsius, thereby providing electrical connectivity in a liquid state in a temperature range that includes an operating envelope of rotorcraft 10 (shown in FIG. 1). It is contemplated that metallic material 108 be non-toxic, and in this respect includes substantially no mercury, cadmium, and/or lead. Examples of suitable metallic materials include Galinstan®, available from Geratherm Medical AG of Geschwenda, Germany.

Figure 4:
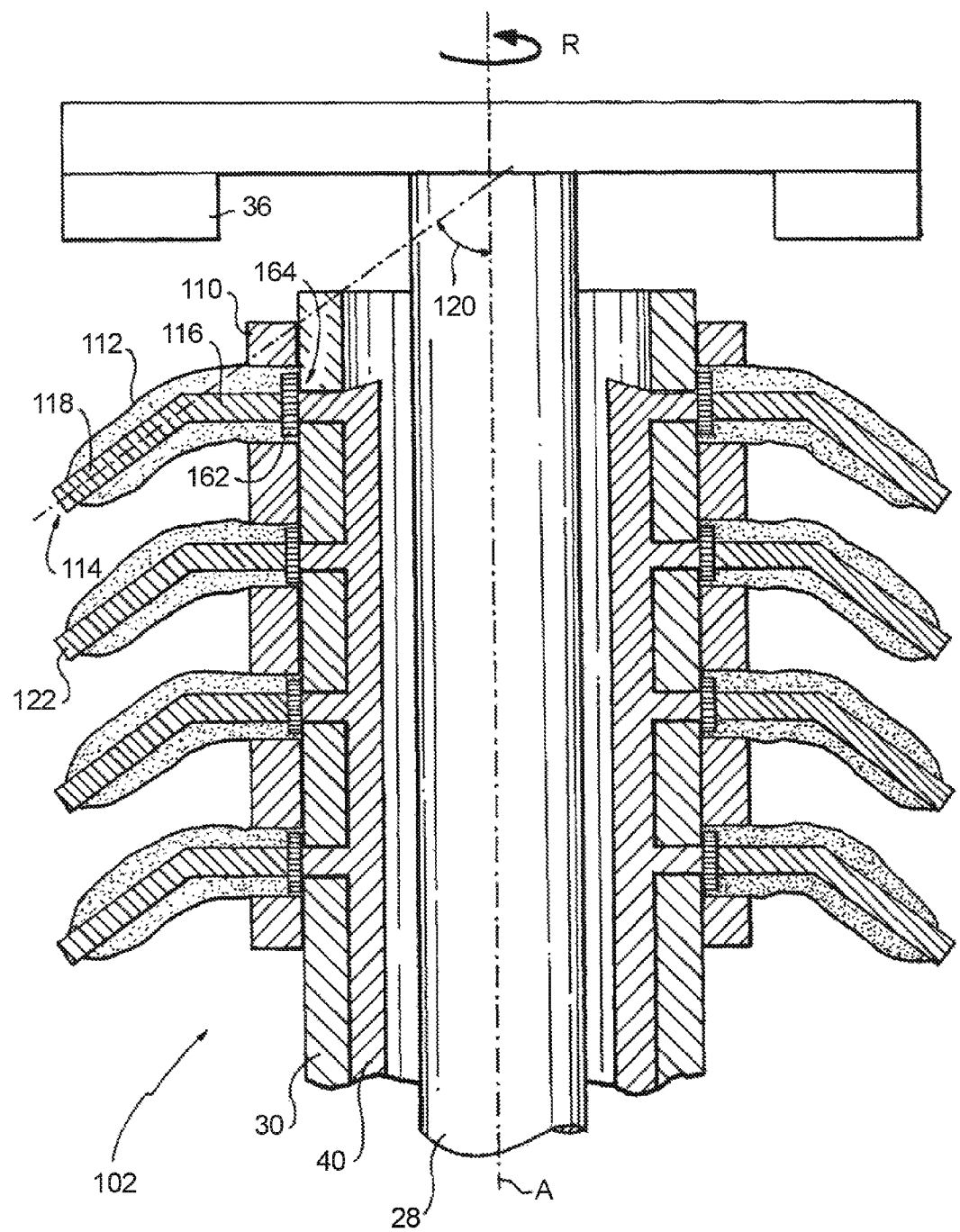
FIG. 4 is a schematic cross-sectional side view of the stationary element of the slip ring assembly of FIG. 1, showing the stationary annular contacts extending radially and axially downward relative to the rotation axis.

With reference to FIG. 4, stationary element 102 and shaft 28 are shown. Stationary element 102 includes a collar 110, an insulating body 112, and at least one stationary annular contact 114. Collar 110 seats circumferentially about the exterior of static mast 30 and axially below a rotor assembly flexible mount 36. Stationary annular contact 114 extends radially through collar 110 and static mast 30 through penetrations defined within collar 110 and static mast 30, and extends axially downwards (relative to gravity during level flight), thereby electrically connecting to a bus bar 40. Bus bar 40 is fixed within static mast 30, extends axially within an interior of static mast 30, and connects electrically to power source 2 (shown in FIG. 1). Flexible mount 36 is connected to an end 38 of shaft 28 to support rotatable element 104 (shown in FIG. 2) for rotation about rotation axis A.

Stationary annular contact 114 has radial segment 116 and an axial segment 118. Radial segment 116 is connected at a radially inner end to bus bar 40, extends through a feedthrough 162 of a clutch 164, and extends radially outward therefrom. In the illustrated exemplary embodiment radial segment 118 is substantially orthogonal relative to rotation axis A. Axial segment 118 is connected at a radially inner end to radial segment 116, and extends radially outward and axially downward therefrom relative to rotation axis A. Clutch 164 is a high torque conductive slip clutch that is configured and adapted to allow an axial portion of radial segment 118 disposed radially outward of clutch 164 to rotate in the event that the liquid metal disposed in rotatable element freezes to axial segment 118, improving reliability of slip ring assembly 100 in cold operating environments, e.g., below −19 degrees Celsius. This permits a portion of the stationary element 102 to rotate with rotatable element 104 in metallic material 108 freezes between stationary annular contact 114 and rotatable contact 126 (shown in FIG. 5).

Between opposing inboard and outboard ends, axial segment 118 defines an oblique angle 120 relative to rotation axis A. As illustrated, angle 120 is about 37.5 degrees. As also shown in FIG. 4, stationary element 102 includes a one or more axially stacked second annular contact 122. The one or more axially stacked second annular contact 122 is in construction to stationary annular contact 114 with the difference it is axially offset relative stationary annular contact 114, thereby providing for additional current carrying capacity or defining additional signal paths through slip ring assembly 100.

Figure 5:
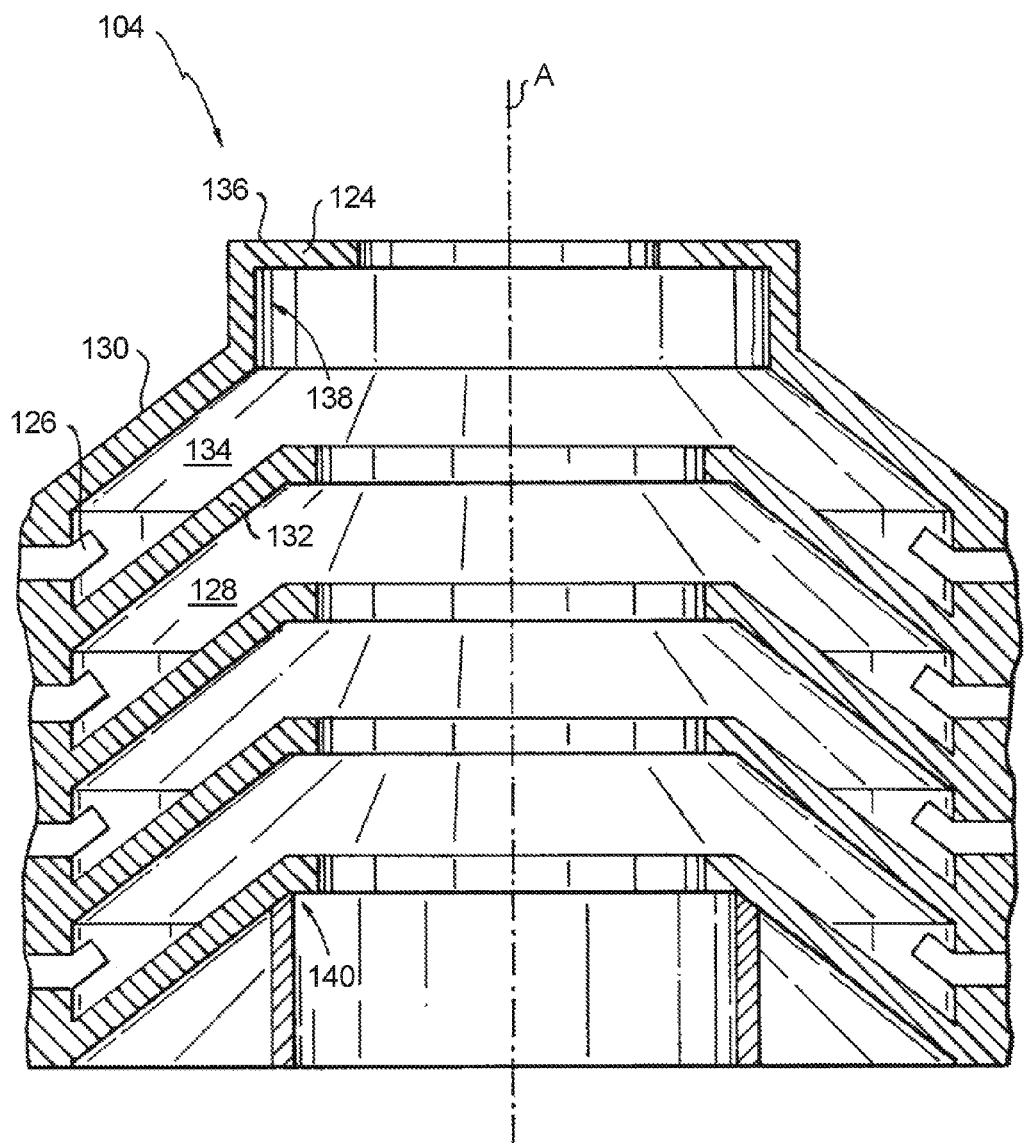
FIG. 5 is a schematic cross-sectional side view of the rotatable element of the slip ring assembly of FIG. 1, showing the gravity well defined by the rotatable element and housing the liquid metal contact.

With reference to FIG. 5, rotatable element 104 is shown. Rotatable element 104 includes a rotatable body 124, a rotatable contact 126, a first flange member 130, and a second flange member 132. First flange member 130 is disposed axially above second flange member 132 relative to rotation axis A and has a lower surface axially facing second flange member 132. Second flange member 132 has an upper surface axially facing the lower surface of first flange member 130. Between the lower surface of first flange member 130 and the upper surface of second flange member 132 rotatable body 124 defines a gravity well 134 to house metallic material 108 (shown in FIG. 3). At its radially outer end, gravity well 134 has radial recess which is bounded by first rotatable contact 126. Stationary element 102 (shown in FIG. 4) is received within rotatable element 104 such that rotatable contact 126 is proximate stationary annular contact 114 with liquid metal contact 106 (shown in FIG. 2) contacting both rotatable contact 126 and stationary annular contact 114 therebetween, thereby providing electrical communication therebetween. Rotatable element is configured with one or more second gravity wells 128, the number of gravity wells defined by rotatable body 124 corresponding to the number of stationary annular contacts incorporated into stationary element 102.

Rotatable body 124 is configured to be supported for rotation about rotation axis A. In this respect rotatable body 124 includes a flexible mount-receiving surface 136 on an axially upper surface of rotatable body 124, defines a first ferrofluidic seal seat 138 axially below flexible mount-receiving surface 136, and defines a second ferrofluidic seal seat 140 on a side of first ferrofluidic seal seat 136 opposite flexible mount-receiving surface 136.

Figure 6:
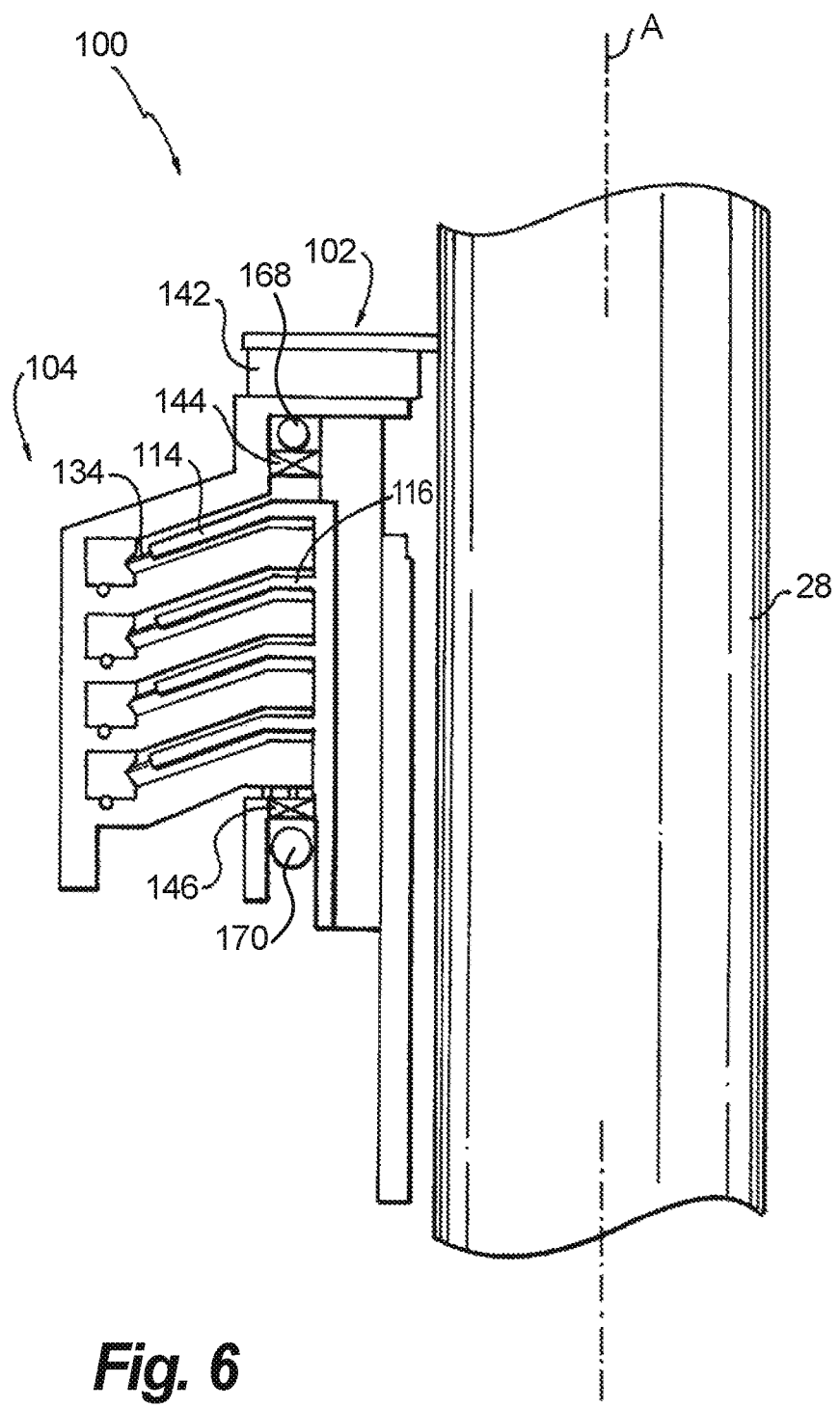
FIG. 6 is schematic cross-sectional side view of the slip ring assembly of FIG. 1, showing the liquid metal contact disposed in a gravity well and coupling a stationary annular contact with a rotatable contact.

With reference to FIG. 6, slip ring assembly 100 is shown. Rotatable element 104 is coupled to shaft 28 by a flexible mounting 142, supported by a first bearing assembly 168 and second bearing assembly 170, and is driven for rotation about rotation axis A. First bearing assembly 168 and second bearing assembly 170 separate stationary element 102 from rotatable element 104, suspend rotatable element 104 relative to stator element 102, and provide axial and radial stability to rotatable element 104. A first ferrofluidic seal 144 is interposed between first bearing assembly 168 and rotatable element 104 such that first ferrofluidic seal bounds gravity well 134 on a radially inner end of gravity well 134. A second ferrofluidic seal 146 is interposed between second bearing assembly 170 and rotatable element 104 such that second ferrofluidic seal 146 bounds gravity well 134 on a radially inner end of gravity well 134. First ferrofluidic seal 144 and second ferrofluidic seal 146 define axially between one another a hermetically sealed gravity well 134 for retaining liquid metal 108. In embodiments, first ferrofluidic seal 144 and second ferrofluidic seal 146 maintain an inert atmosphere I (shown in FIG. 7) within gravity well 134 bounding liquid metal 108 on a radially inner end gravity well 134 both axially above and axially below gravity well 134. Bearing assemblies disposed an axially upper and axially lower sides of first ferrofluidic seal 144 and second ferrofluidic seal 146 both support rotatable element 104.

The stationary annular contacts, e.g., stationary annular contact 114, extend radially outward and axially downward relative to rotation axis A and are received within a respective gravity well, e.g., gravity well 134. Therein they electrically connect to the rotatable contacts, e.g., rotatable contact 126, through liquid metal contact 106 (shown in FIG. 2) disposed within the respective gravity well.

Figure 7:
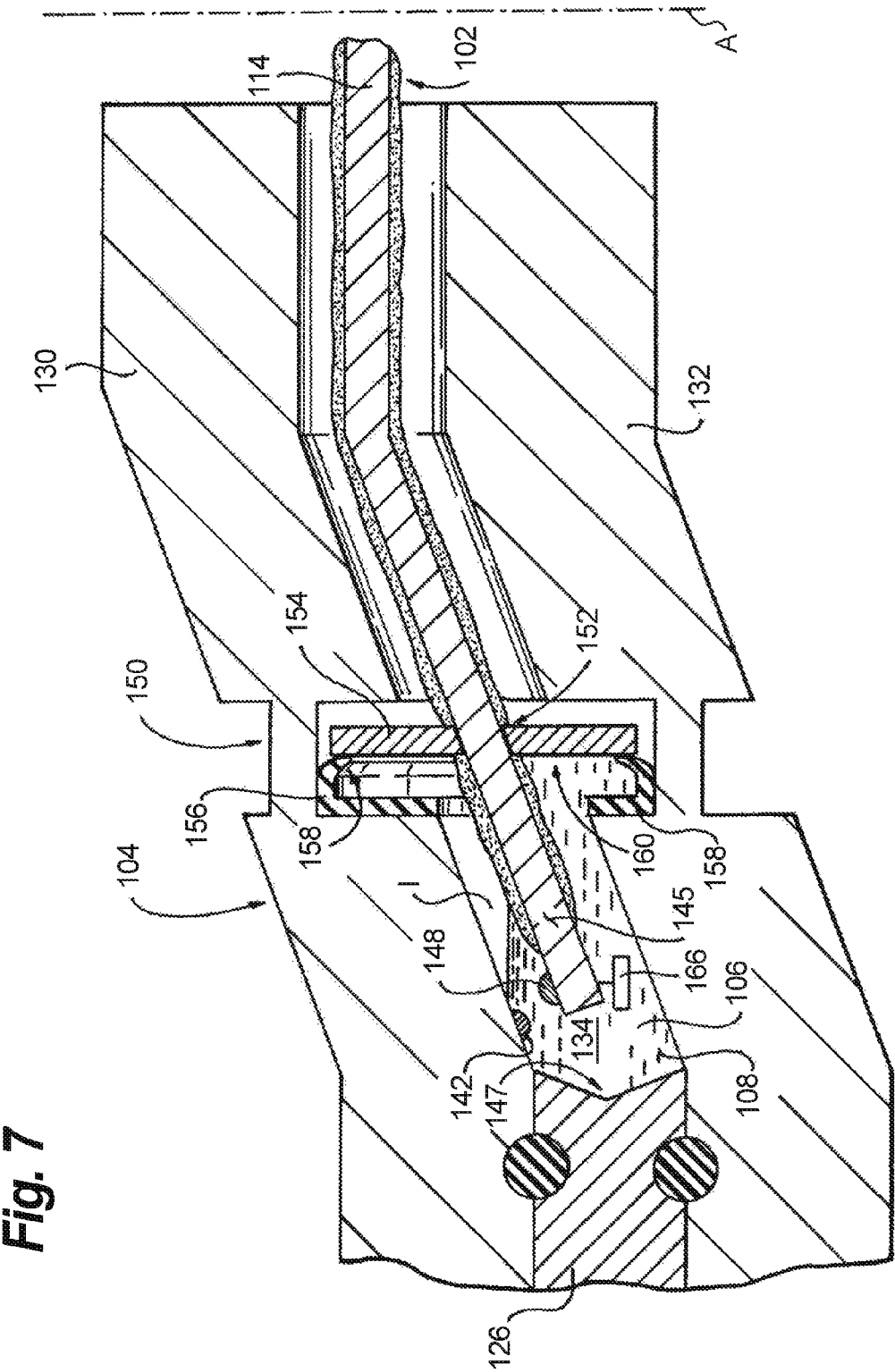
FIG. 7 is a schematic cross-sectional side view of the gravity well of FIG. 6, showing a dry seal bounding the gravity well on a radially inner side of the rotatable element.

With reference to FIG. 7, portions of rotatable element 104 and stationary element 102 are shown. First flange member 130 is axially stacked with second flange member 132 along rotation axis A with a radially extending gap therebetween. Rotatable contact 126 and stationary annular contact 114 are disposed axially between first flange member 130 and second flange member 132, and radially oppose one another within gravity well 134. Liquid metal contact 106 and radially interposed rotatable contact 126 and stationary annular contact 114 within gravity well 134, electrically connecting rotatable contact 126 with stationary annular contact 114 and allowing mechanical rotation of one relative to the other.

Gravity well 134 is bounded by a portion of the lower surface of first flange member 130, a portion of the upper surface of second flange member 132, rotatable contact 126, and a dry seal 150. Between dry seal 150 and rotatable contact 126, gravity well 134 extends radially outward and axially downward relative to the rotation axis A. Stationary annular contact 114 extends through a hermetic feed through 152 defined by dry seal 150. Stationary annular contact 114 extends radially outward and axially downward relative to rotation axis A such that a gap defined between stationary annular contact 114 and rotatable contact 126 within gravity well 134 is occupied by metallic material 108 of liquid metal contact 106 in a hermetic environment. It is contemplated that either or both of gravity well 134 and stationary annular contact 114 extending axially downward relative to rotation axis A at an oblique angle, such as angle 120 (shown in FIG. 4), the shape of gravity well 134 cooperating with centrifugal force during rotation to keep liquid metal 108 forming liquid metal contact 106 in gravity well 134. One or more o-rings can be disposed between the flange members, thereby sealing the lower recess of gravity well 134 while allowing for an axially stacked and modular assembly.

Portions of either or both of first flange member 130 and second flange member 132 may include an insulative coating 142, which can include Teflon® by way of non-limiting example. Rotatable contact 126 can include a contoured surface 147, illustrated schematically as a notch in the illustrated exemplary embodiment, to facilitate electrical conductivity between liquid metal contact 106 and rotatable contact 126 over a range of rotational speeds of rotatable element 104 relative to stationary element 102. Either or both of rotatable contact 126 and stationary annular contact 114 can include a copper-containing material 145, and a portion of the copper containing material in contact with liquid metal contact 106 can include a tantalum-containing coating 148.

Dry seal 150 includes an annular seal race 154, a first seal flange 156, and a second seal flange 158. Annular seal race 154 extends axially along rotation axis A and presents a radially outer surface 160 to first seal flange 156 and second seal flange 158. A radially outer surface 160 defines a low-friction surface that is stationary relative to rotating first seal flange 152 and second seal flange 158. Annular seal race 154 defines hermetic feed through 152, may be constructed from stainless steel, and includes a low-fiction radially outer surface 160 that sealably receives both first seal flange 152 and second seal flange 158. It is contemplated that the low-friction radially outer surface 160 may include a polished stainless steel surface portion that sealably receives tips of both first seal flange 152 and second seal flange 158, thereby reducing friction loss and wear during rotation.

First seal flange 156 seats within an annular groove defined within the lower surface of first flange member 130. Second seal flange 158 seats within an annular groove defined within the upper surface of second flange member 132 axially opposing first seal flange 156, first seal flange 156 and second seal flange 158 thereby being axially offset from second seal flange 158 along and concentrically arranged about rotation axis A. Both first seal flange 156 and second seal flange 158 extend radially inward toward annular seal race 154 to sealably engage low-friction radially outer surface 160, thereby hermetically sealing metallic material 108 of liquid metal contact 106 within gravity well 134. It is contemplated that either or both of first seal flange 156 and second seal flange 158 may include a polytetrafluoroethylene (PTFE), prolonging the interval between dry seal replacement or eliminating the need to service dry seal 150 during the operational lifetime of rotorcraft 10 (shown in FIG. 1). Either or both of first seal flange 156 and second seal flange 158 may be doped with graphite, further reducing frictional losses during rotation.

A heater element 166 may be in thermal communication with metallic material 108. Heater element 166 is configured and adapted to provide a predetermined amount of heat to metallic material 108 for purposes of keeping the temperature of metallic material 108 in a liquid state, i.e. above the melting point of metallic material 108, during time intervals where the ambient environment is at a temperature below the melting point of metallic material 108. In the illustrated exemplary embodiment heater element is electrically connected to stationary annular contact 114 and immersed within metallic material 108 in gravity well 134. Alternatively, heater element 166 may be fixed relative to rotatable element 104 and electrically connected to stationary annular contact 114, such as through metallic metal 108.

Conventional slip ring assemblies typically employ solid-state elements in frictional contact with one another at an interface between stationary and rotating components. While satisfactory for their intended purpose, the performance of such slip ring assemblies can be challenged by cold and dry operating conditions such as those commonly found at high altitude environments. Such solid-state slip ring assemblies can also deteriorate or crack from relatively small amounts of oil that may find its way into such slip ring assemblies from rotor actuation systems and lubricated rotor system components. Such solid-state slip ring assemblies can also wear, requiring periodic removal of debris and potentially flammable carbon dust resulting associated with the wear.

In embodiments described herein, a liquid metal contact electrically connects a rotatable element with a stationary element of a slip ring assembly. In certain embodiments, the liquid metal forming the contact is environmentally friendly and non-toxic, simplifying assembly and maintenance of the slip ring assembly. In particular, in contemplated embodiments, the slip rig assembly is substantially mercury-free. It is further contemplated that the liquid metal can be packaged hermetically within a gravity well that provides a large insides diameter and which, in certain embodiments, is electrically quiet for providing reliable data transmission between the electrical devices communicating through the slip ring assembly.

The methods and systems of the present disclosure, as described above and shown in the drawings, provide for slip ring assemblies with superior properties including improved reliability. Embodiments of slip ring assemblies described herein may also provide one or more of increased service life, resistance to contamination, reduced wear debris, increased power capability, higher and cleaner data rates, improved durability, lower maintenance requirements, and scalability. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A slip ring assembly, comprising:
   a stationary element;
   a rotatable element rotatable relative to the stationary element; and
   a liquid metal contact electrically coupling the rotatable element to the stationary element, wherein the liquid metal contact includes a metallic material that is a melting point that is below zero (0) degrees Celsius and a boiling point that is about four-hundred (400) degrees Celsius.

2. A slip ring assembly as recited in claim 1, wherein the metallic material has a boiling temperature that is greater than about one-thousand (1000) degrees Celsius.

3. A slip ring assembly as recited in claim 1, wherein the metallic material has an electrical conductivity that is greater than $3.0 \times 10^6$ siemens per meter at twenty (20) degrees Celsius.

4. A slip ring assembly as recited in claim 1, wherein the metallic material includes a eutectic alloy comprising gallium, indium, and tin.

5. A slip ring assembly as recited in claim 1, wherein the metallic alloy comprises 68% gallium by total weight, 22% indium by total weight, and 10% tin by total weight.

6. A slip ring assembly as recited in claim 1, wherein the rotating element includes a rotor shaft defining a rotation axis, a bus bar radially outward from the rotor shaft, and a static mast circumferentially surrounding the bus bar and rotor shaft.

7. A slip ring assembly as recited in claim 1, wherein the rotating element defines a rotation axis, and further including a ferrofluidic seal disposed between the rotatable element and the stationary element.

8. A slip ring assembly as recited in claim 1, wherein the rotating element defines a gravity well extending about the stationary element.

9. A slip ring assembly as recited in claim 8, wherein the gravity well extends radially outward and axially downward relative to the rotatable element.

10. A slip ring assembly as recited in claim 8, wherein the stationary element includes a stationary annular contact extending radially outward from axially downward relative the rotatable element.

11. A slip ring assembly as recited in claim 1, further including a dry seal disposed on a radially inner end of the liquid metal contact and hermetically sealing the metallic material of the liquid metal contact within the rotatable element.

12. A slip ring assembly as recited in claim 11, wherein the dry seal includes an annular seal race extending about the stationary element with a polished stainless steel surface.

13. A slip ring assembly as recited in claim 12, wherein the annular seal race defines a hermetic feed through, and further including a stationary annular contact extending through the hermetic feed through.

14. A slip ring assembly as recited in claim 11, wherein the dry seal hermetically bounds a gravity well housing the metallic material.

15. A rotorcraft, comprising:
a rotor assembly rotatable about a rotation axis and having an electrical device;
a bus bar extending axially along the rotation axis; and
a slip ring assembly as recited in claim 1 coupling the electrical device to the electrical bus,
wherein the stationary element is connected to the electrical bus,
wherein the rotatable element is connected to the electrical device, and wherein the liquid metal contact electrically couples the electrical device to the electrical bus during rotation of the rotor assembly about the rotation axis.

* * * * *